No. 775,313. PATENTED NOV. 22, 1904.
W. J. SCHLACKS.
AIR BRAKE CONTROLLING APPARATUS.
APPLICATION FILED OCT. 24, 1903.
NO MODEL. 4 SHEETS—SHEET 1.
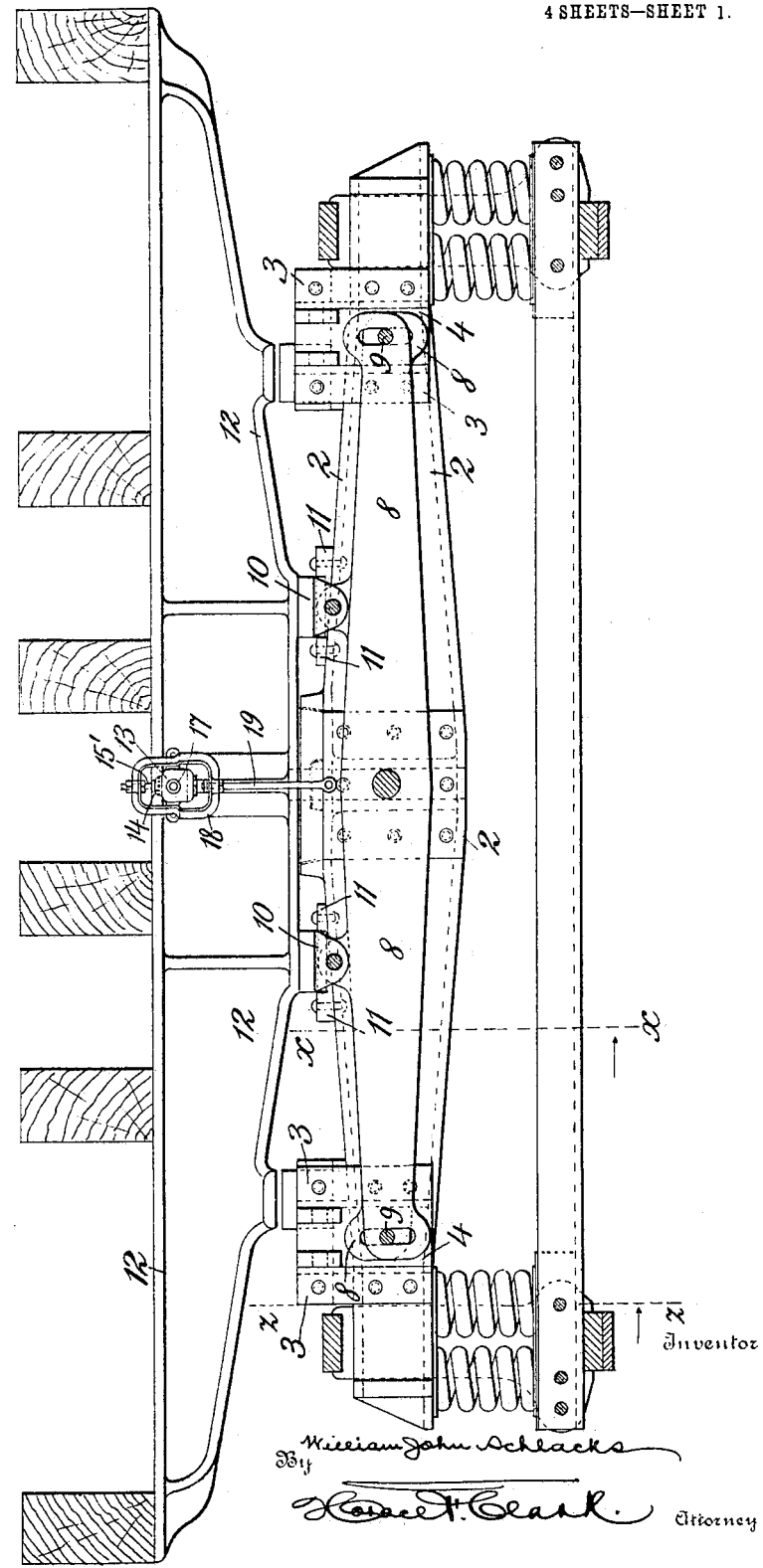

No. 775,313. PATENTED NOV. 22, 1904.
W. J. SCHLACKS.
AIR BRAKE CONTROLLING APPARATUS.
APPLICATION FILED OCT. 24, 1903.
NO MODEL. 4 SHEETS—SHEET 2.
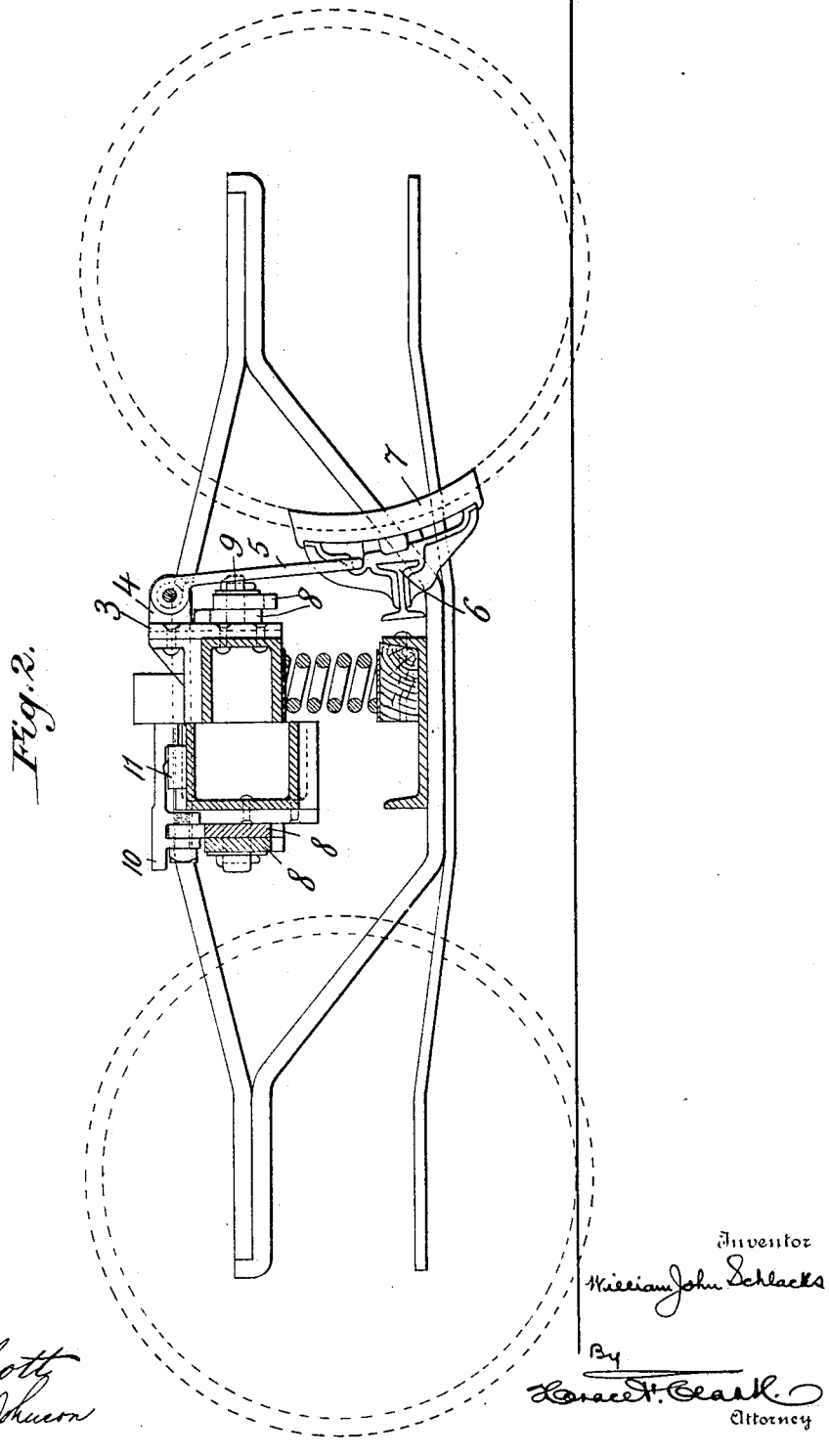

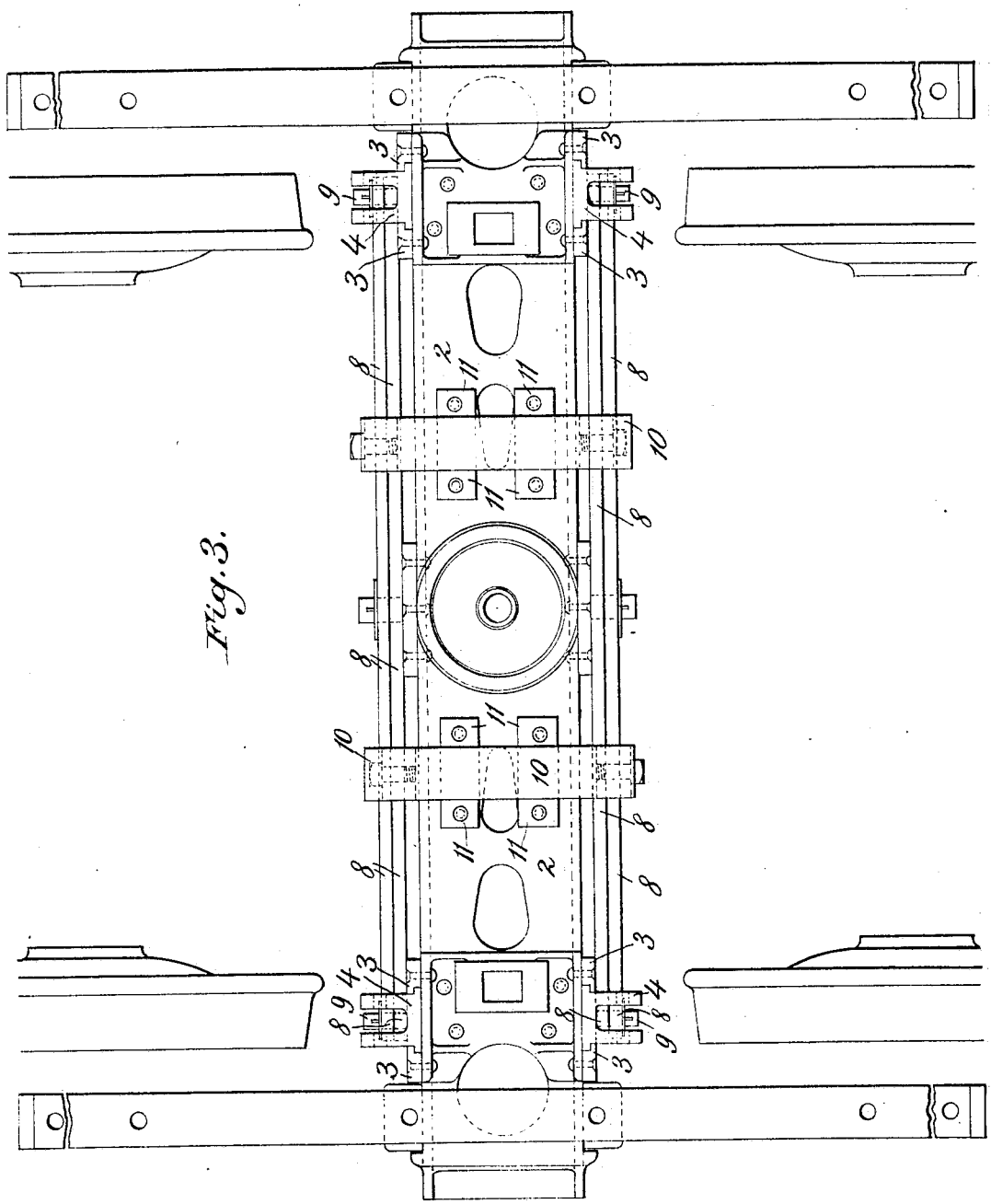

No. 775,313. PATENTED NOV. 22, 1904.
W. J. SCHLACKS.
AIR BRAKE CONTROLLING APPARATUS.
APPLICATION FILED OCT. 24, 1903.
NO MODEL. 4 SHEETS—SHEET 4.
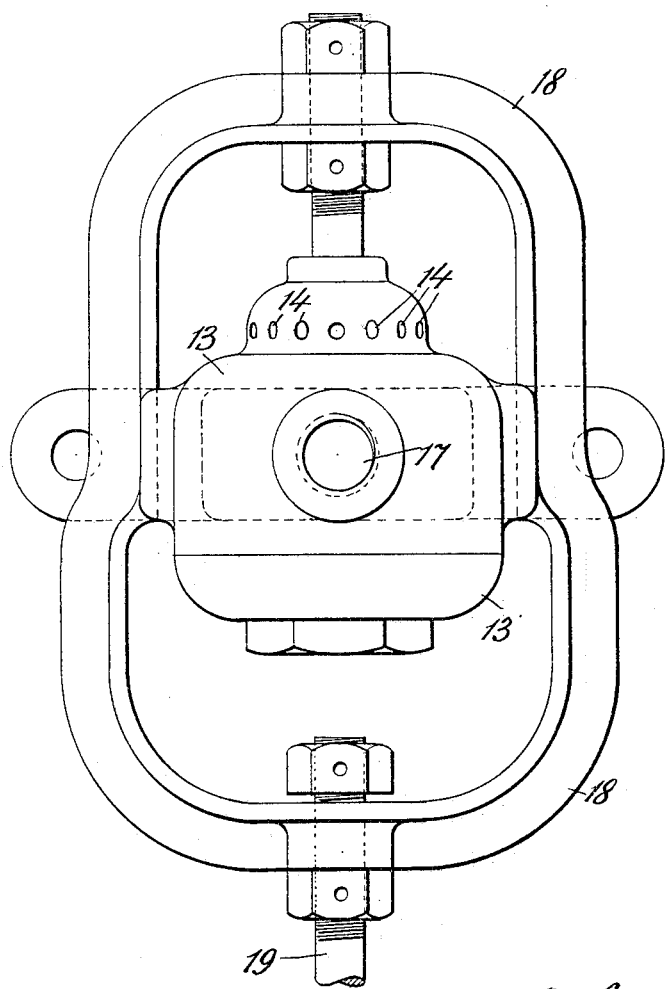
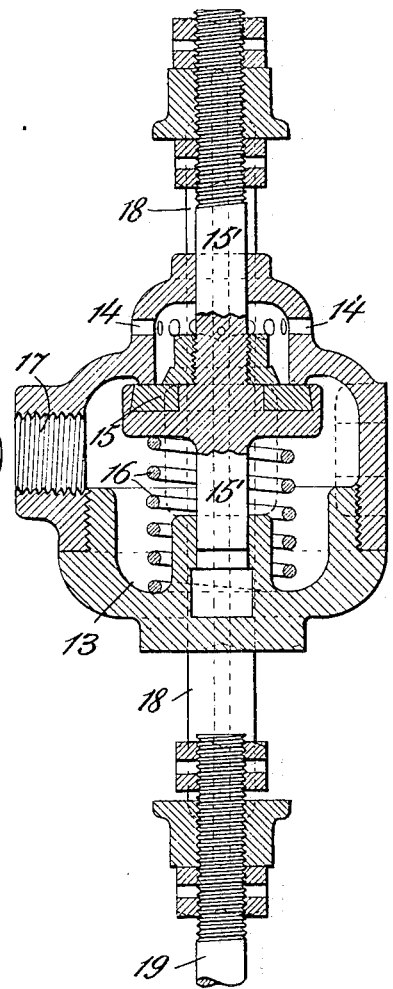
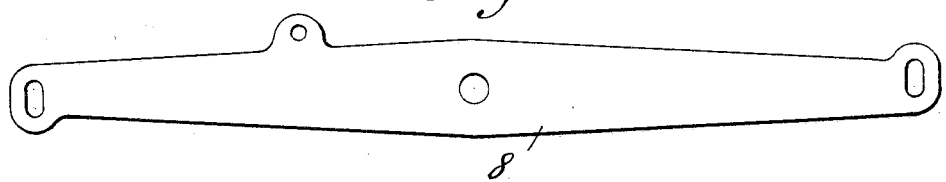

No. 775,313. Patented November 22, 1904.

UNITED STATES PATENT OFFICE.

WILLIAM JOHN SCHLACKS, OF COLORADO SPRINGS, COLORADO.

AIR-BRAKE-CONTROLLING APPARATUS.

SPECIFICATION forming part of Letters Patent No. 775,313, dated November 22, 1904.

Application filed October 24, 1903. Serial No. 178,401. (No model.)

*To all whom it may concern:*

Be it known that I, WILLIAM JOHN SCHLACKS, a citizen of the United States, residing at Colorado Springs, in the county of El Paso and State of Colorado, have invented new and useful Improvements in Air-Brake-Controlling Apparatus, of which the following is a specification.

This invention relates to air-brake-controlling apparatus.

The object of the invention is to provide simple, automatic, and effective means for equalizing the braking power applied to the wheels of a car by the weight of the car-body load and speed and the retarding force of such braking power, or, in other words, the apparatus regulates the retarding force applied to the wheels and allows such force at no time to exceed a certain proportion of the weight of the car upon the rails.

In the drawings accompanying and forming a part of this specification I have shown one simple and convenient embodiment of the apparatus and will hereinafter describe the same in detail; but I desire at this point to state that the invention is not limited to the disclosure made thereby, for divers changes may be adopted within the scope of my claims.

Referring to the drawings, Figure 1 is a sectional front elevation of a truck and car-body provided with an apparatus embodying my invention. Fig. 2 is a sectional side elevation on lines *x x* and *z z* of Fig. 1, and Fig. 3 is a top plan view of the same. Fig. 4 is a detail elevation of a compressed-air tank and valve mechanism. Fig. 5 is a sectional elevation of the same, and Fig. 6 is an elevation of a lever.

Like characters refer to like parts throughout the several figures.

In several figures of the drawings I have shown portions of a car-truck and car-body in conjunction with which the improved apparatus may be employed, the truck being of course provided with the usual wheels.

The truck-bolster is denoted by 2, and it may be made of the usual material, shape, and size. On the opposite sides of the truck-bolster near its ends are suitably attached—say by riveting—the angular plates 3, which constitute suitable guides for the vertically-reciprocative cross heads or slides 4, four of these slides being provided on each truck. The plates 3 not only serve as effective guides for the cross-heads, but also constitute inside column-guides to limit the lateral motion of the truck-bolster 2. To the upper sides of the cross heads or slides 4 are pivotally connected the links or hangers 5, from the lower ends of which a brake-beam 6 is suspended by some suitable form of joint, the brake-beam carrying at its opposite end brake-shoes 7. Upon the opposite sides of the truck-bolster are fulcrumed substantially midway between their ends the levers, each denoted by 8, there being a pair of levers upon each side of the bolster and the levers of the respective pairs being arranged contiguous to each other. I will now proceed to describe in detail only one pair of levers, the other pair being exactly the same in construction and operation.

Each of the pairs of levers 8 has elongated vertically-disposed slots in its opposite ends, through which pins or studs, as 9, projecting laterally from the vertically-reciprocative cross heads or slides 4, extend, each pin, it being evident, extending through two slots. Normally the upper end of one slot—say the outside slot at the left of Fig. 1—will engage the coöperating pin 9, while the lower end of the adjacent slot will engage the same pin, the reverse arrangement being followed at the opposite end of said levers.

Over the top of the truck-bolster 2 and at opposite sides of its center are the shoes 10 of plate form, which are horizontally slidable between suitable parallel guideways, as 11, upon the truck-bolster. The opposite ends of these shoes have depending ears suitably pivoted to the two pairs of levers 8 at opposite sides of their axes of motion. The guideways 11 prevent, absolutely, lateral motion of the shoes 10 with respect to the truck-bolster, and consequently prevent a similar motion with respect to the oscillatory levers 8, which, it will be remembered, coöperate with the vertically-reciprocative slides 4. The shoes 10 engage the under side of the body-bolster 12.

It will be apparent that when the brakes are applied the force exerted, which tends to pull the brake-beam 6 in the direction of the revolving wheel and which force is the coefficient of friction multiplied by the pressure against the wheel, will pull or push on the links or hangers 5 and transfer a corresponding motion to the coöperating cross-heads 4.

It will be assumed that the revolving wheel is pulling down on the said links or hangers 5. The cross head or slide 4 at the left in Fig. 1 will be drawn down and through the pin 9 will engage the inside lever 8 and draw what is shown as the left branch thereof down, the same motion following with respect to the opposite cross-head and the outside lever. The result will be that the shoes 10 are elevated. Let it be supposed that the rotating wheel pushes up on the hangers or links 5, the shoes 10 will be also elevated. It will be remembered that these shoes have been described as being in contact with the under side of the body-bolster 12, they being represented as being in contact with the center plate of said bolster. It therefore follows that any movement of the coöperating levers 8 under the action of the cross-heads 4, either up or down, will tend to raise the body-bolster 12, providing, of course, the power applied to said cross-heads is sufficient to overcome the weight of the body of the car and its load and separate the body and truck-bolster. This operation cannot occur, of course, except when unusual braking power is applied to the car, or, in other words, more retarding force applied to the wheels than the weight of the car on the rails will permit.

Upon the body-bolster 12, substantially centrally thereof, is suitably fastened the compressed-air casing or chamber 13, having in its top or crown a plurality of annularly-disposed outlets 14 opening into the atmosphere and which are normally held closed by the valve 15 of disk form held to its seat by the pressure of air under it and also by a coiled spring 16, surrounding the lower portion of the stem 15' thereof and bearing, respectively, against the bottom of the casing or chamber 13 and the under side of the valve. The upper portion of said stem projects through the top of the casing. Said casing or chamber has an inlet 17, into which a pipe (not shown) leading from the brake-cylinder (not shown) is tapped, by virtue of which the pressure of air in said casing or chamber is always the same as that of the brake-cylinder. The yoke 18 surrounds and is guided by suitable means on the compressed-air casing or chamber 13, and it has suitably united to the under side thereof the rod 19, pivotally connected at its lower end to the truck-bolster 2, substantially midway thereof, the upper end of the yoke being connected with the valve-stem.

When the valve 15 is unseated by the elevation of the compressed-air casing or chamber 13, the brake-cylinder pressure is necessarily reduced by exhausting the excessive brake-cylinder pressure to the atmosphere, the air passing into the casing or chamber 13 and then through the outlets 14 into the atmosphere, it being understood that upon the elevation of the casing or chamber the valve remains stationary. The reseating of the valve occurs when the retarding force on the wheels has been reduced to the predetermined portion of the weight of the car upon the rails. When the body-bolster 12 has been raised a certain distance from the truck-bolster 2, a distance sufficient to exhaust the air from the brake-cylinder to the atmosphere by unseating the valve 15, the levers 8 lock themselves about the pins 9 of cross-heads, by reason of which no difficulty will be experienced by the severe application of hand-brakes or should the reduction in the retarding force applied to the wheels not be realized.

The locking feature of the levers is as follows: When the cross-head or sliding block 4 at the left in Fig. 1 is lowered, it is evident that the adjacent end of the outside lever 8 will be moved in a corresponding direction, the other end of the lever being thrust upward. The reverse operation follows with respect to the inside lever. The levers therefore travel in opposite directions one-half the length of the slots therein minus the diameter of the pins. Since both sides of the levers act simultaneously, they will be locked against further movement after they have traveled a certain distance or a distance sufficient to secure the unseating of the valve 15 in the manner hereinbefore described in order to reduce excessive cylinder-pressure.

A car can be equipped with a braking power, as heretofore, in excess of its light weight, so that it will be a proper proportion to the loaded car. For instance, if a car is loaded to its full capacity with a braking power proportioned to its loaded weight the levers 8 will not have power enough to raise the body from the truck and all the braking power will be realized, but when said car is empty the retarding force applied to the wheels will through said levers raise the car-body from the truck, unseat the valve 15, and exhaust the excessive pressure of air into the atmosphere, after which said body will return to its initial position and exhaust from the brake-cylinder will cease, by reason of which there will be applied to an empty or lightly-loaded car all the retarding force that the weight thereof on the rails will permit.

The high-speed feature of this system is also important. It is a well-known fact that the coefficient of friction between a wheel and the shoe of a brake-beam reduces as the speed increases and that the coefficient between said wheel and rail is not materially affected by the speed of the car. It is therefore apparent that with the old ways of braking there was no increase in braking power for an increase in speed, but really a reduction in retarding force when running at a high speed. With the present apparatus the original braking power can be much greater than a car with an ordinary braking device would allow at slow speeds.

It is evident that where said apparatus is used a certain coefficient of friction must be attained before an automatic reduction in cylinder-pressure occurs.

Let it be assumed that a train equipped with said apparatus is running at sixty miles an hour and that the retarding force exerted on the wheels is just enough to cause a maximum safe reduction in speed. When the speed has been reduced, say, to fifty miles per hour, the coefficient of friction has increased to such an extent as to necessitate a reduction in brake-cylinder pressure or slide the wheels, which would reduce the retarding effect of the brakes. Just as soon as this condition arises the force of that coefficient, multiplied by the brake applied exerted on levers 8, will raise the car-body and reduce the brake-cylinder pressure to a maximum safe retarding power for this speed. As the coefficient again increases, due to a still further reduction in speed, it is evident the levers must act again and raise the car-body in the same manner and continue to do so until a higher coefficient than the one of last exhaust cannot be attained.

Having thus described the invention, what is claimed as new is—

1. The combination with a car-body and a wheeled truck, of a compressed-air casing mounted on said car-body, a valve in said casing and a series of horizontally-disposed levers for actuating the valve.

2. The combination with a car-body, a body-bolster and a wheeled truck, of a compressed-air casing mounted on said body-bolster, a valve in said casing and a series of levers disposed horizontally of the truck for actuating the valve.

3. The combination of a car-body and a wheeled truck, of brakes for the wheels of said truck, a compressed-air casing mounted on said body having a valve, and means operable by the movement of the brake-shoe for elevating the car-body and operating the valve.

4. The combination with a car-body, the body-bolster and a truck-bolster, of a compressed-air casing mounted on the body-bolster, a valve in said casing, and a series of levers reversely operable by the retardation of the car-body for operating the valve.

5. The combination of a car-body and a wheeled truck, brakes for the wheels of said truck, a compressed-air casing having an outlet, a valve in said casing for controlling said outlet, a yoke surrounding and guided by said casing and connected with the stem of said valve, a rod connected with the said truck and stem, mechanism operated by the brakes for elevating the car-body, and means for normally holding said valve against its seat.

6. The combination of a car-body and a wheeled truck, brakes for the wheels of said truck, a compressed-air casing having an outlet, a valve in said casing for controlling said outlet, a yoke surrounding and guided by said casing and connected with the stem of said valve, a rod connected with the said truck and stem, mechanism operable by the brakes for elevating the car-body, and a spring surrounding the lower portion of the valve-stem and bearing against the valve and casing.

7. The combination of brake mechanism, two pairs of levers having elongated slots at opposite sides of their fulcrums, vertically-reciprocative means provided with pins projecting through the slots and bearing against the opposite ends thereof, means actuated by the brake mechanism for operating said vertically-reciprocative means, to thereby move said levers, a valved compressed-air casing, having an outlet, and mechanism controlled by the levers for causing the valve to open said outlet.

8. The combination of brake mechanism, two pairs of levers having elongated slots at opposite sides of their fulcrums, vertically-reciprocative blocks provided with pins projecting through the slots and bearing against the opposite ends thereof, means actuated by the brake mechanism for operating said vertically-reciprocative blocks to thereby move said levers, a valved compressed-air casing having an outlet, and mechanism controlled by the levers for causing the valve to open said outlet.

9. The combination of a car-body, a compressed-air casing carried thereby, a wheeled truck upon which the body is mounted, a valve in said casing for controlling an outlet therein, operatively connected with said truck, two pairs of levers mounted upon the truck, having elongated slots at opposite sides of their fulcrums, vertically-reciprocative means upon the truck, provided with pins projecting through said slots and bearing normally against the opposite ends thereof, brake mechanism upon the truck, means actuated by the brake mechanism for operating said vertically-reciprocative means to thereby move said levers, and means actuated by the levers for imparting an upward thrust to the car-body upon the working movement of said levers.

10. The combination of a car-body, a compressed-air casing attached thereto, having an outlet to the atmosphere, a valve in said casing, a wheeled truck upon which said body is mounted, operatively connected to said valve, two pairs of levers mounted upon the truck and having elongated slots at opposite sides of their fulcrums, vertically-reciprocative blocks upon the truck provided with pins projecting through said slots and bearing against the opposite ends thereof, brake mechanism upon the truck, means actuated by the brake mechanism for operating said vertically-reciprocative blocks to thereby actuate the levers, and a pair of horizontally-slidable shoes mounted upon the truck, operatively connected with said levers and serving upon the movement of the levers to impart an upward thrust to the car-body.

11. The combination of a car-body, a compressed-air casing, having an outlet to the atmosphere, a valve in said casing, a wheeled truck upon which said body is mounted, operatively connected to said valve, two pairs of levers mounted upon the truck and having elongated slots at opposite sides of their fulcrums, vertically-reciprocative blocks upon the truck provided with pins projecting through said slots and bearing against the opposite ends thereof, brake mechanism upon the truck, means actuated by the brake mechanism for operating said vertically-reciprocative blocks to thereby actuate the levers, a pair of horizontally-slidable shoes mounted upon the truck, operatively connected with said levers and serving upon the movement of the levers to impart an upward thrust to the car-body, and means upon the truck for preventing lateral motion of the shoes.

12. The combination of a car-body, a compressed-air casing having an outlet to the atmosphere, a valve in said casing for controlling said outlet, a wheeled truck upon which the car-body is mounted, operatively connected to said valve, shoes upon the truck for engaging the car-body, two pairs of levers upon the truck having elongated slots at opposite sides of their fulcrums and operatively connected with said shoes, vertically-reciprocative blocks upon the truck having pins projecting through said slots and bearing normally against the opposite ends thereof, brakes for engaging the wheels of the truck, and hangers suspended from said vertically-reciprocative blocks and operatively connected with said brakes.

13. The combination with a vehicle provided with brake mechanism, and a series of levers for effecting the application of said brake-shoe to the wheel with a variable power regulable by the opposing forces of the vehicle.

In testimony whereof I have signed my name to this specification in the presence of two subscribing witnesses.

WILLIAM JOHN SCHLACKS.

Witnesses:
CHAS. A. BAILEY,
I. A. RICE.